United States Patent
Perez et al.

(10) Patent No.: US 9,451,161 B2
(45) Date of Patent: Sep. 20, 2016

(54) SYSTEM AND METHODS FOR VIDEO IMAGE PROCESSING

(71) Applicants: Timothy William Perez, Albuquerque, NM (US); Marios Stephanou Pattichis, Albuquerque, NM (US); Yuebing Jiang, Albuquerque, NM (US)

(72) Inventors: Timothy William Perez, Albuquerque, NM (US); Marios Stephanou Pattichis, Albuquerque, NM (US); Yuebing Jiang, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 407 days.

(21) Appl. No.: 14/069,153

(22) Filed: Oct. 31, 2013

(65) Prior Publication Data

US 2014/0340470 A1    Nov. 20, 2014

Related U.S. Application Data

(60) Provisional application No. 61/825,183, filed on May 20, 2013.

(51) Int. Cl.
*H04N 5/00* (2011.01)
*H04N 5/232* (2006.01)
*G06T 3/40* (2006.01)

(52) U.S. Cl.
CPC ......... *H04N 5/23238* (2013.01); *G06T 3/4007* (2013.01)

(58) Field of Classification Search
CPC .................. H04N 5/23238; G06T 3/4007
USPC ........................................... 348/36
See application file for complete search history.

(56) References Cited

U.S. PATENT DOCUMENTS

| | | |
|---|---|---|
| 2007/0010710 A1 | 1/2007 | Perez |
| 2009/0248036 A1* | 10/2009 | Hoffman ............... A61B 34/32 606/130 |

* cited by examiner

*Primary Examiner* — Jeffery Williams
(74) *Attorney, Agent, or Firm* — Valauskas Corder LLC

(57) ABSTRACT

Certain embodiments of the present invention include a system and methods for providing a video image display technology with separate video perspective displays. Each perspective display may be tailored and adapted in real-time to the differing roles of each user, e.g., one or more medical professionals of a surgical team. As an example, one video perspective display may be a panoramic perspective display for a primary surgeon and a second video perspective may be a detailed perspective display for the surgical assistant.

6 Claims, 10 Drawing Sheets

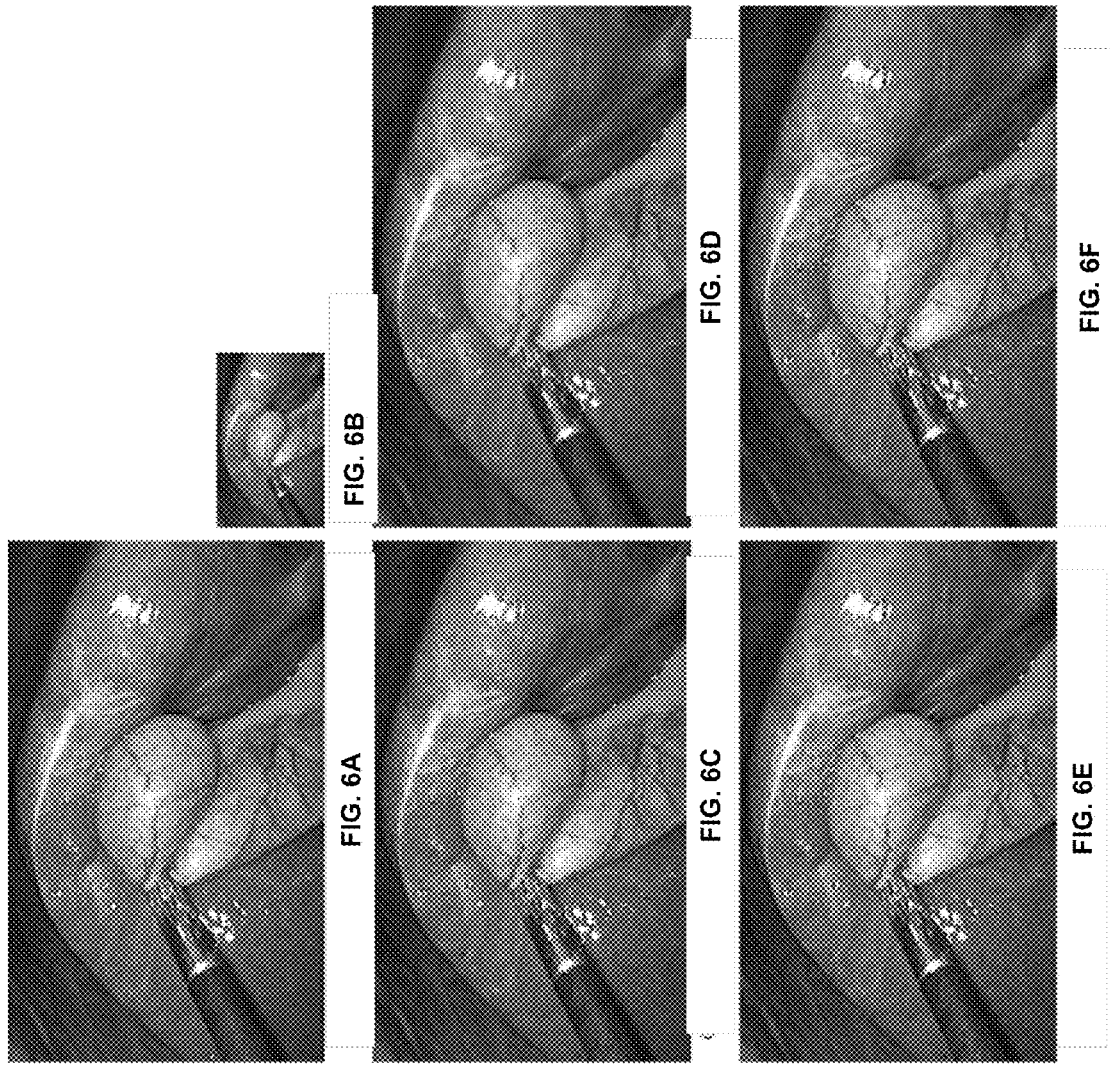

SYSTEM AND METHODS FOR VIDEO IMAGE PROCESSING

CROSS REFERENCE TO RELATED PATENTS

This application claims the benefit of U.S. Provisional Application No. 61/825,183 filed May 20, 2013, which is incorporated by reference herein in its entirety.

FIELD OF THE INVENTION

The invention relates generally to displaying video images from a single source.

BACKGROUND OF THE INVENTION

Video imaging technology permits capturing and displaying images of a target, possibly via an input/output interface such as an output component. Examples of an output component include a screen, monitor, touchscreen, speaker, light-emitting diode display, or projector and/or receiving element for projector (including, e.g., a wall projector, overhead projector, or head-mounted projector such as a Google Glass® unit).

Such video imaging technology has many applications. For example, video imaging may be used for security functions (e.g., video surveillance of residences, commercial locations, warehouses, valuable objects, or other objects or location areas), observation functions (e.g., observing a nanny, housekeeper, or pet, possibly remotely), educational functions (e.g., transmitting lectures or discussions in distance education programs), business functions (e.g., virtual meetings or communication with remote customers or colleagues), and media functions (e.g., broadcasting news, television programs, or movies). In addition, video imaging technology may be used for tracking functions (e.g., monitoring the quantity of goods or services rendered, quantity of people that enter or exit a location area, studying an experimental object, or progress of a task), healthcare functions (e.g., facilitating surgical examination or operations using small incisions and small camera systems), and other communication functions.

Certain known video camera systems are configured to convey video images to an output component generally in real-time. There may be advantages to such systems. For example, if a security officer reviews surveillance video images generally in real-time and perceives a threat to a target, the security officer may be able to intervene and possibly prevent or minimize harm to the target. Also, if a business person receives meeting video images generally in real-time, that business person can contribute to the meeting, possibly by transmitting his or her own video images, sending an email or text notification, or participating by telephone. In addition, if a health care professional is performing a surgical examination or operation using a small camera to perceive the surgery site, the health care professional may rely on the real-time video images to perceive how and where to manipulate the surgical instruments.

When performing certain functions, there may be a need to provide two perspectives of a target in real-time. For example, a security officer may wish to perceive two perspectives of the same target to permit perceiving both a close-up perspective of the target (e.g., to identify a crack in a glass case around a valuable object) and a wide-view perspective of the target (e.g., possibly to observe which direction an offender went after cracking the glass case). A business person may wish to perceive two perspectives of a meeting room, specifically, a close-up perspective of a specific meeting participant and a wide-view perspective of the entire room possibly to permit recognizing certain dynamics of the entire meeting. Also, when two or more health care professionals are performing the surgical examination or operation, each professional may need a different perspective of the surgical site to perform their job optimally.

Certain known imaging systems and procedures are configured to display two identical perspectives or two very similar perspectives of the same target. Clearly, such systems do not meet the need for simultaneously providing one close-up perspective and one wide-view perspective.

Additional imaging systems have been developed to provide two different perspectives in real-time. One such conventional imaging system permits showing the same perspective in two different displays, e.g., Internet browsers. Then, each user can manually adjust the zoom level of each of the two perspectives according to his or her needs. However, for certain functions, the user may be multitasking (e.g., manipulating surgical tools or taking notes while perceiving the video images of the target), which renders manually adjusting the zoom level of the video image challenging. In addition, the quality of the zoomed-in image often is poor.

Another conventional system for providing two different perspectives simultaneously provides higher resolution images by using two cameras, one for capturing each perspective. However, such two-camera systems may be cost-prohibitive, size-limiting if access to the target is restricted, or possibly detrimental to the observation if the second camera intensifies the observer effect. For purposes of this application, the term "observer effect" means the changes in the target that may be caused observing the target. Examples of the observer effect known in the art include the Heisenberg effect and Hawthorne effect.

Other attempts to provide video images split into two different perspective displays of a target have been unreliable, computationally expensive, or otherwise resulted in exceedingly low quality resolution of each perspective display.

Clearly, there is a demand for a system and methods for automatically and reliably providing two high-quality perspective displays of a target from a single camera source generally in real-time. The present invention satisfies this demand.

SUMMARY OF THE INVENTION

Certain embodiments of the present invention are configured to provide two different perspective displays of a target from a single video image generated by a single camera source component. Each of the two or more perspective displays is a type of output video image configured to be shown by an output component.

For purposes of this application, the term "target" means that which is the subject of interest, the subject that the user intends to convey, or a subject within the angle of view of the camera source component. For example, a target may be a single object, a portion of an object, a group of objects, a location area, a specific location, or a site inside of an object (e.g., a site inside the body of an organism).

For purposes of this application, the term "video image" indicates any type of moving image (typically made up of a series of still images (e.g., video frames) flashed so quickly that, because of persistence of vision, appear as a moving image). A video image may be stored, for example, as a video file. A video file is a set of information that when read by a computer processor causes an output component in communication with the computer processor to display a video image. Examples of video image files include BMP file type for still images, MPEG-1 file type for digital video, MPEG-2 file type for digital video, and JPEG file type for still images.

In certain embodiments, a single camera source component captures video image of a target. By processing the video image from that single camera source component, the video image is converted into one or more different perspective displays. For purposes of this application, the present invention is discussed in reference to systems and methods configured to produce two perspective displays, but the discussion is merely exemplary. The present invention also may be configured to produce only one perspective display or three or more perspective displays.

One perspective display—termed a "detailed perspective display" for purposes of this application—may be generally configured to provide information about a smaller area of or around a target relative to the panoramic perspective display. Another possible perspective display—termed a "panoramic perspective display" for purposes of this application—may be generally configured to provide information about a wider area of or around a target.

Each perspective display of the original video image ultimately may be shown by an output component. In other embodiments, a single output component shows two or more perspective displays of the target.

The system and methods may be configured to show two different perspective displays of the target generally in real-time relative to when the video images are captured. In other embodiments, the video images may be shown in a time-delayed manner after the video images are captured. In still additional embodiments, the system and methods are configurable to show the video image perspective displays in both real-time and time-delayed manners.

Certain embodiments of the present invention include not only a camera source component and one or more output components, but also an image management component. Each of these components will be discussed in more detail below.

For purposes of this application, a "camera source component" is any camera device configured to capture a video image of a target within its field of view and possibly also send such video image to an image management component. A camera source component also may include a source device configured to receive video images from a source outside itself and send those video images to an image management component.

Examples of a camera source component include a digital camera such as a still-picture camera, a video camera, a webcam, a camera embedded in a smartphone or other generally hand-held device, a camera embedded in a tablet, swallowable camera, an endoscopic camera such as a laparoscopic camera, other medical cameras, security cameras, or other cameras known in the art.

For purposes of this application, an "image management component" may include a video image receiving element, an interpolation element, a frame rate control element, a first temporary storage element, and a second temporary storage element. The elements of an image management component may form a specialized computer system.

A video image receiving element may be configured to accept video images sent from the camera source component and, in certain embodiments, convert the video images from one format to another. Examples of a video image receiving element include a video capture card, video editing card, TV tuner card, video adapter, or other elements known in the art.

An interpolation element is configured to increase the perceived quality of a portion of the video image. More specifically, an interpolation element may generate intermediate pixels that extend the resolution of the original video (as captured) to the displayed resolution so as to increase the perceived quality of the detailed perspective display.

The portion of the video image that undergoes interpolation is called the "detailed precursor frames" of the video image. Upon completion of the processing, the detailed precursor frames of the video image become the detailed perspective display. In contrast, the portion of the video image that does not undergo interpolation is called the panoramic precursor frames of the video image, which becomes the panoramic perspective display.

A frame rate control element is configured to set the amount of video frames flashed per time period. For example, the frame rate of the panoramic precursor frames may be decreased to save resources, which may be spent increasing the perceived quality of the detailed precursor frames.

A first temporary storage element and a second temporary storage element may be configured to store a video image or some portion of a video image (e.g., precursor frames) for a generally short period of time before it is sent to another component or element, such as an output component. In certain embodiments, a first temporary storage element and a second temporary storage element may be a framebuffer formed by a portion of the RAM in the main memory, a virtual buffer, or other element known in the art. Portions of or the entire video image may be stored as a bitmap.

Certain embodiments of the present invention include method steps configured to be implemented by the system. For example, in certain embodiments, the camera source component captures a video image of a target and sends the video image to the video image receiving component. Portions of the video image—in certain embodiments, the detailed precursor frames and the panoramic precursor frames—may be treated differently.

Next, the system may crop the detailed precursor frames to remove segments—typically peripheral segments—that do not show the narrow site of interest. Because the non-site segments of the video image has been removed, the remaining site section of the video image can be enlarged to fill the display space formerly occupied by the non-site segments.

However, when enlarging the video image, the perceived quality of the resulting display may be decreased. Accordingly, in certain embodiments, the intermediate pixels are generated to extend the resolution of the original video image to the displayed resolution so as to increase the perceived quality of the detailed perspective display (a process called interpolation). A number of interpolation methods are available and, in certain embodiments, which interpolation method is applied may be automatically chosen by the system or may be chosen by the user via a user interface.

The system balances the frame rate of the detailed precursor frames—those that have been cropped, enlarged, and interpolated—and the panoramic precursor frames to maximize perceived quality for the detailed precursor frames while maintaining an acceptable video quality in the panoramic precursor frames. The video resolution for the detailed precursor frames may be increased and its frame rate is typically maintained at a higher rate (but less than the acquired frame-rate) than the frame rate for the panoramic precursor frames may be decreased. The basic goal is to shift computational resources from the non-detailed panoramic perspective display (where they are not needed as much since such action will not significantly reduce video quality) to the detailed perspective display.

For example, in certain embodiments, the system may automatically select (or permit a user to select) a temporal frame reduction factor configured to set the frame rate for the non-altered frames. A temporal frame reduction factor of 1 is equal to the original frame rate, while a frame rate of 6 includes flashing 1 out of every 6 frames relative to the original frame rate.

The detailed precursor frames may be stored in a first temporary storage component and the panoramic precursor frames may be stored in a second temporary storage component.

Subsequently, a detailed perspective display may be shown in a first output component and a panoramic perspective display may be shown in a second output component.

The invention and its attributes and advantages may be further understood and appreciated with reference to the detailed description below of one contemplated embodiment, taken in conjunction with the accompanying drawings.

BRIEF DESCRIPTION OF THE DRAWINGS

The preferred embodiments of the invention will be described in conjunction with the appended drawings provided to illustrate and not to limit the invention, where like designations denote like elements, and in which:

FIG. 6A illustrates a frame of a video image captured directly from a camera source component;

FIG. 6B illustrates the frame of FIG. 6A that has been minimized;

FIG. 6C illustrates a frame of a video image that has been interpolated using the nearest neighbor approach;

FIG. 6D illustrates a frame of a video image that has been interpolated using the bilinear approach;

FIG. 6E illustrates a frame of a video image that has been interpolated using the bicubic approach;

FIG. 6F illustrates a frame of a video image that has been interpolated using the lanczos4 approach;

DETAILED DESCRIPTION

For purposes of this application, the present invention is discussed in reference to systems and methods of video image processing configured for use during minimally invasive surgeries, but the discussion is merely exemplary. The present invention is applicable to any function for which a single camera source component providing two different high resolution perspective displays of a target is useful.

Minimally invasive surgery may include various benefits such as reduced post-operative discomfort, reduced chance of infection, quicker recovery times, shorter hospital stays, quicker return to full activity, smaller external scars, and less internal scarring. Accurate and precise manipulation of surgical tools or instruments is desired during any surgical procedure, but this is particularly true with minimally invasive surgery.

Laparoscopic surgery is one type of minimally invasive surgery performed through small incisions. During laparoscopic surgeries, the health care professionals typically insert a video-capturing laparoscope into the body of the patient and thread the laparoscope through the body to reach a site of interest. Visualization of the operative field is provided by the laparoscope and is the "eyes" for the entire surgical team. Adapting the view of the operative field to meet changing conditions is possible by panning the laparoscope. However, conventional laparoscopes cause only a single perspective of the operative field to be projected on the video monitor at a given moment. Although the entire surgical team can see the operative field, the visual requirements of the primary surgeon differ from a surgeon's assistant, termed an "assistant" for purposes of this application. The primary surgeon typically needs to see a lot of detail about the surgical site, while the assistant needs to see a wider view of the surgical site. More specifically, the assistant may need to manipulate instruments out of their visual field. A single, shared perspective therefore may not be optimally informative for the needs of individual surgical team members. Functioning without visual feedback is inefficient and potentially dangerous. Clearly, different perspective displays tailored to the different roles of the surgical team such as those provided by the present invention are needed.

Figure 1:
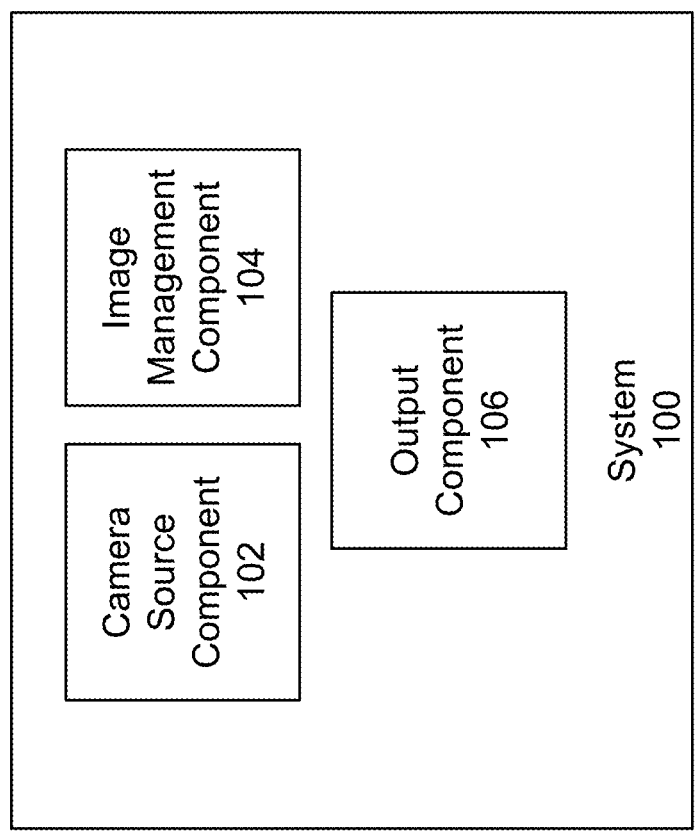
FIG. 1 illustrates a system embodiment of the present invention.

As illustrated in FIG. 1, certain embodiments of the present invention include a camera source component 102, an image management component 104, and one or more output components 106.

Figure 2:
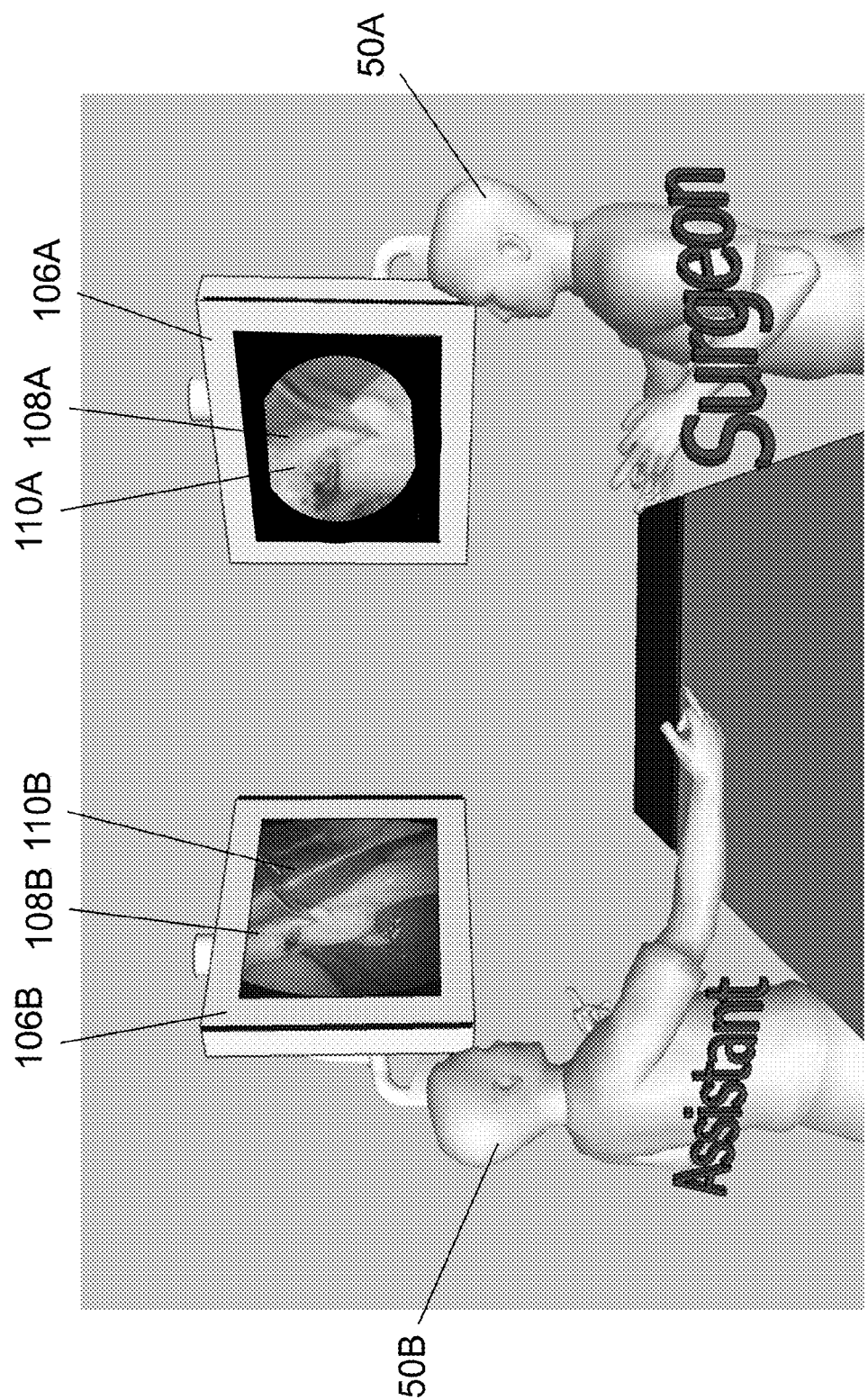
FIG. 2 illustrates two users and two output components according to the present invention.

As illustrated in FIG. 2, the system 100 may include more than one output component such as a first output component 106A and a second output component 106B. Each output component 106 may include a display element 108 configured to show a perspective display of a video image or other portion of a video image. FIG. 2 illustrates an embodiment in which a video image is converted into a first perspective display 110A configured as a detailed perspective display and a second perspective display 110B configured as a panoramic perspective display. Each perspective display 110 is tailored for the anticipated needs of the intended user 50, in certain embodiments, a surgeon 50A or an assistant 50B.

Figure 3A:
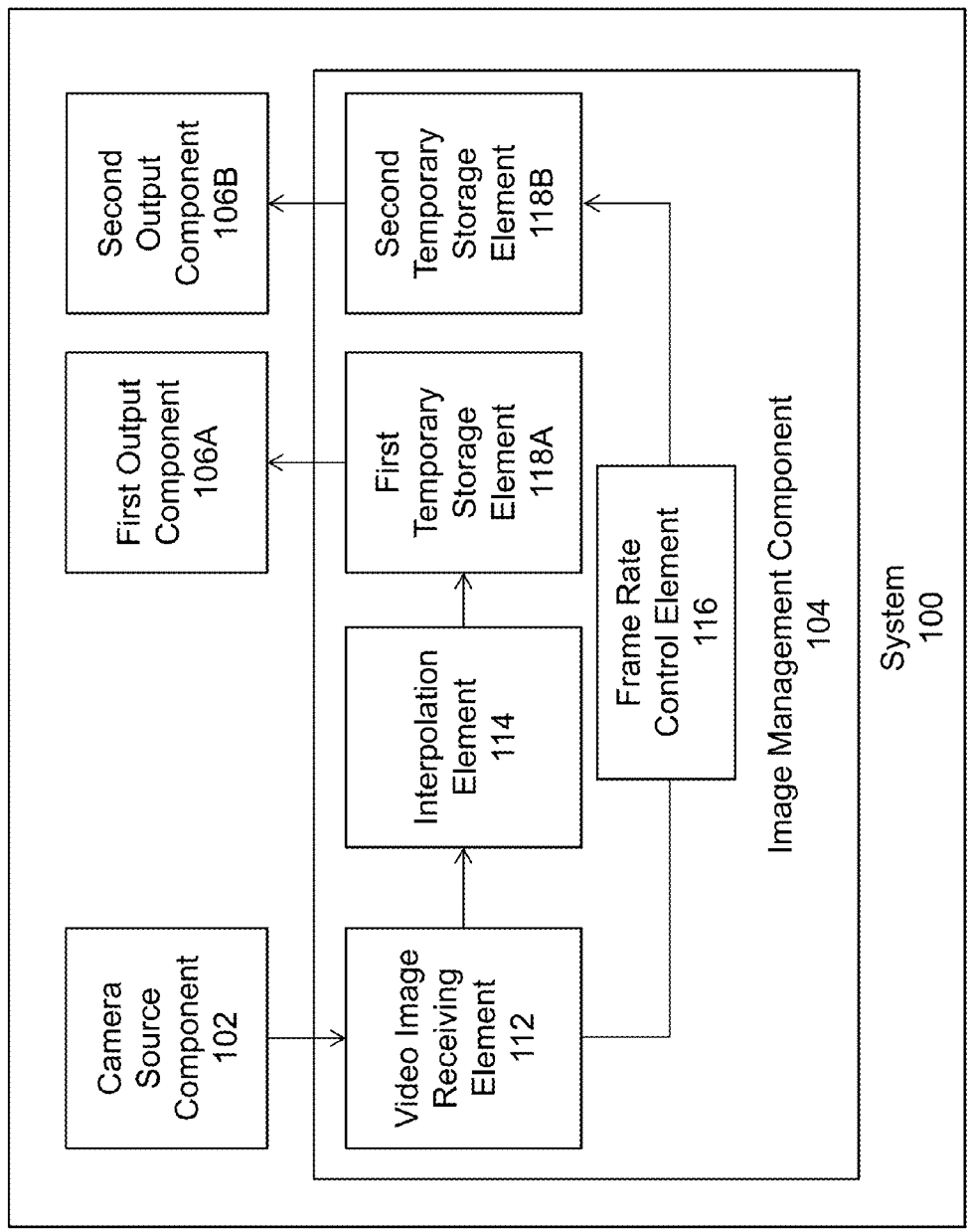
FIG. 3A illustrates another system embodiment of the present invention.
Figure 3B:
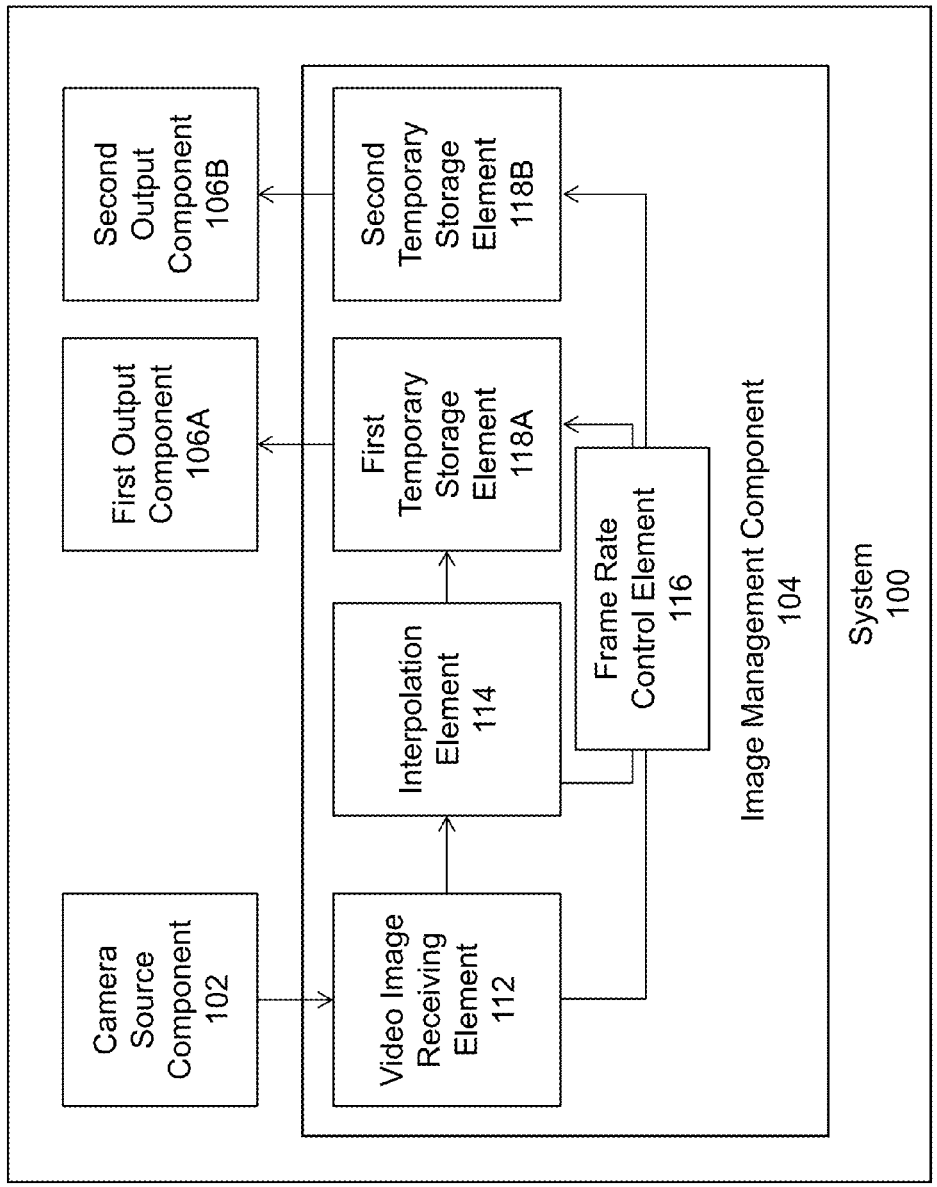
FIG. 3B illustrates yet another system embodiment of the present invention.

As illustrated in FIG. 3, an image management component 104 may include a video image receiving element 112, an interpolation element 114, a frame rate control element 116, a first temporary storage element 118A, and a second temporary storage element 118B.

Figure 4:
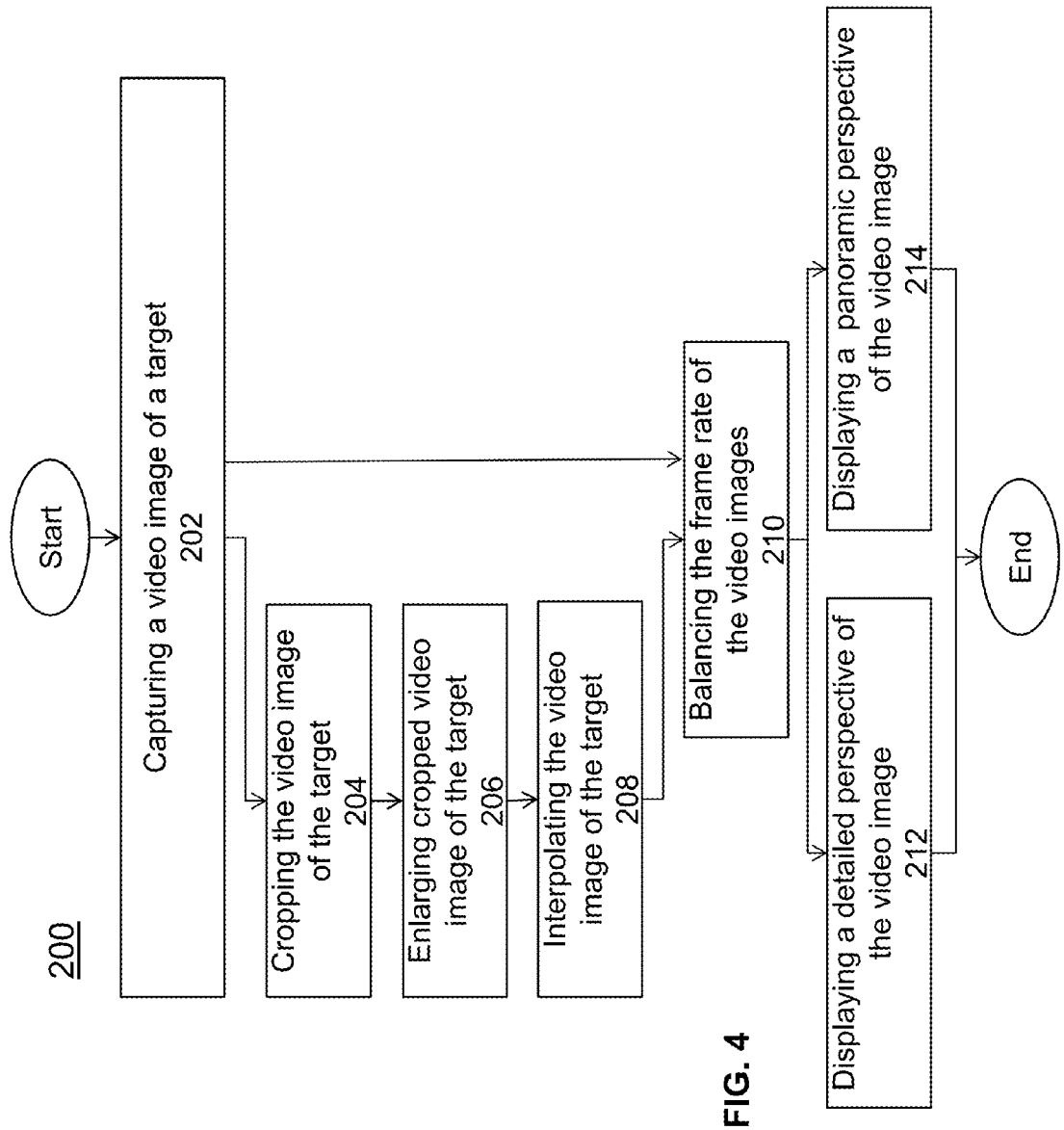
FIG. 4 illustrates a flowchart representing a method embodiment of the present invention.

As illustrated in FIG. 4, certain embodiments of the present invention include method 200 steps configured to be implemented by the system. For example, in certain embodiments, the camera source component captures a video image of a target 202 and sends the video image to the video image receiving component. Two or more portions of the video image—that is, the detailed precursor frames and the panoramic precursor frames—may be treated to different steps throughout the process.

Figure 5A:
FIG. 5A illustrates a panoramic perspective display of a video image.
Figure 5B:
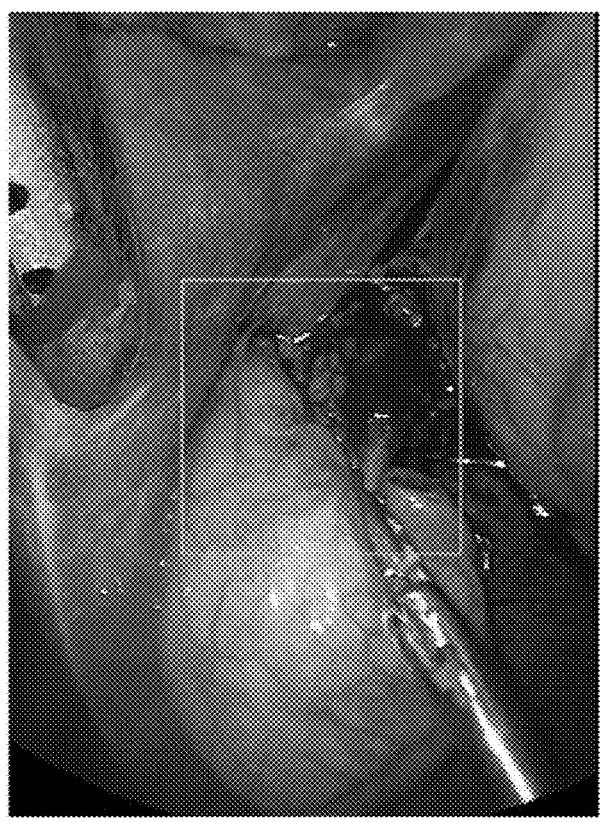
FIG. 5B illustrates a detailed perspective display of a video image.

The system crops the detailed precursor frames to remove certain non-site segments—typically peripheral segments—of the video image that do not display the specific site of interest 204. Because the non-site segments of the video image has been removed, the remaining site section of the video image can be enlarged to fill the space formerly occupied by the non-site segments. (An example of a non-cropped image frame is illustrated in FIG. 5A and a cropped image frame is illustrated in FIG. 5B.)

However, when enlarging the video image, some resolution or other quality characteristic may have been reduced. Accordingly, in certain embodiments, the detailed precursor frames are interpolated 208. A number of interpolation methods are available and, in certain embodiments, which interpolation method is applied may be automatically chosen by the system.

More specifically, examples of interpolation methods include anisotropic approaches, regularized local linearized regression model for edge preserved interpolation approach, nearest-neighbor approach, bilinear approach, bicubic approach, and Lanczos4 approach.

The anisotropic approaches and regularized local linearized regression model approaches for edge preserved interpolation approach may be used in certain embodiments; however, they may not be chosen in others because of possible incompatibility with arbitrary zooming function of certain embodiments of the system.

In nearest neighbor interpolation, the interpolated pixel takes the value of its nearest neighbor. In terms of memory accesses, the image is analyzed row-by-row. In an efficient implementation, a single image row is stored in a cache. The nearest-neighbor interpolation method requires the minimum number of memory accesses while not requiring the implementation of any arithmetic operations. An example of a nearest neighbor interpolated image is illustrated in FIG. 6C. To contrast, an uninterpolated image is illustrated in FIG. 6A and a minimized image is illustrated in FIG. 6B.

However, because introduction of significant block artifacts at significant zooming levels, this approach is most effective for lower-level zooming.

Bilinear interpolation includes the determination of the 4 nearest points. This is implemented in two phases. First, the sections along the columns are interpolated. Second, the sections along the rows are interpolated. The implementation is based on:

$$f_c(x+p,y) = f(x,y) \cdot (1-p) + f(x+1,y) \cdot p, \quad (1)$$

$$f(x+p,y+q) = f_c(x+p,y) \cdot (1-q) + f_c(x+p,y+1) \cdot q, \quad (2)$$

where $p, q \in (0, 1)$. Compared to nearest-neighbor interpolation, bilinear interpolation does not suffer from severe blocking artifacts. Bilinear interpolation provides a balance between computational efficiency and interpolation accuracy. An example of a bilinear interpolated image is illustrated in FIG. 6D.

In Bicubic interpolation, the nearest neighbor points (4×4 neighborhood) are used to estimate the interpolated pixel. The approach is separable in the sense that we interpolate along the rows and columns separately. It is an extension of bilinear interpolation in the sense that it fits the data with a piecewise cubic model. Naturally, this higher-order model comes with need for more continuity in the image. An example of a bicubic interpolated image is illustrated in FIG. 6E.

The Lanczos interpolation approach is based on the sinc function. Here, the sinc function may be the optimal choice for band-limited signals. However, unlike real images, band-limited signals are infinite. Also, the sinc function itself is infinite. Furthermore, if the edges are modeled using step functions, band-limited approximations may produce ringing artifacts around each edge. Lanczos interpolation is thus based on truncating the sinc-function over a local, 8×8 window of the nearest neighboring pixels. An example of a Lansczos4 interpolated image is illustrated in FIG. 6F.

Table 1 illustrates the computational efficiency of certain of the approaches in a per pixel format.

|  | Nearest neighbor | Bilinear | Bicubic | Lanczos4 |
|---|---|---|---|---|
| Additions/Subtractions | 0 | 3 | 17 | 15 |
| Multiplies | 0 | 2 | 22 | 40 |

Additional embodiments are described below.

In certain embodiments, the video images may be captured at 1920×1088 pixels per frame at 30 fps, while in other embodiments video images may be captured at 720×480 pixels per frame at 30 fps.

The system balances the frame rate of the detailed precursor frames—those that have been cropped, enlarged, and interpolated—and the panoramic precursor frames to concurrently maximize the video image quality for both displays 210. The frame rate for the detailed precursor frames may be maintained at a relatively higher rate to allow for detection of rapidly-changing events or status of the target, and the frame rate for the panoramic precursor frames—may be decreased to conserve certain computational resources that are then allocated to generating the detailed perspective display. For example, in certain embodiments, the system may automatically select (or permit a user to select) a temporal frame reduction factor configured to set the frame rate for the non-altered frames. A temporal frame reduction factor of 1 is equal to the original frame rate, while a frame rate of 6 includes flashing 1 out of every 6 frames relative to the original frame rate. By reducing the update rate of the panoramic view, higher quality detailed perspective displays may be produced.

In certain embodiments, the frame rates may be from 16 to 40 frames per second for the detailed perspective display. These frame rates can be downsampled, for example, from 1 to 6 for generating the panoramic perspective display.

Table 2 (below) illustrates execution times for different components of certain embodiments of the present invention.

| Procedure | Time (ms) mean ± std. dev. |
|---|---|
| Video capture | 0.427 ± 0.013 |
| Video crop | 0.050 ± 0 |
| Nearest neighbor interp. | 1.53 ± 0.074 |
| Bilinear interp. | 8.38 ± 0.304 |
| Bicubic interp. | 12.25 ± 0.539 |
| Lanczos4 interp. | 24.17 ± 0.487 |
| Video display | 10.38 ± 0.047 |

Table 3 (below) illustrates frame rates (in frames per second) for the altered frames configured to form a detailed perspective display in certain embodiments.

|  | Int. Method | | | |
| --- | --- | --- | --- | --- |
| Down. Fr. rate | Nearest neighbor | Bilinear | Bicubic | Lanczos4 |
| 1 | 24.87 | 22.05 | 21.08 | 16.93 |
| 2 | 31.88 | 27.90 | 26.26 | 19.94 |
| 3 | 34.41 | 30.66 | 28.41 | 21.08 |
| 4 | 36.62 | 31.82 | 29.55 | 21.72 |
| 5 | 37.98 | 33.53 | 30.65 | 22.28 |
| 6 | 39.11 | 34.72 | 31.32 | 22.91 |

Table 4 (below) illustrates the mean reconstructed PSNR/SSIM over 100 interpolated video frames in certain embodiments. PSNR is in dB and SSIM is bounded above by 1.

|  | Int. Method | | | |
| --- | --- | --- | --- | --- |
| Sp. Down. rate | Nearest neighbor | Bilinear | Bicubic | Lanczos4 |
| 2 × 2 | 25.24 dB/ 0.7343 | 28.75 dB/ 0.8485 | 28.45 dB/ 0.8455 | 28.34 dB/ 0.8392 |
| 3 × 3 | 23.77 dB/ 0.6627 | 26.70 dB/ 0.7844 | 26.23 dB/ 0.7789 | 26.05 dB/ 0.7677 |
| 4 × 4 | 22.70 dB/ 0.6155 | 24.88 dB/ 0.7199 | 24.32 dB/ 0.7100 | 24.14 dB/ 0.6974 |
| 5 × 5 | 22.78 dB/ 0.6289 | 24.29 dB/ 0.7019 | 23.77 dB/ 0.6959 | 23.59 dB 0.6824 |
| 6 × 6 | 22.34 dB/ 0.6133 | 24.28 dB/ 0.7060 | 23.72 dB/ 0.7006 | 23.51 dB/ 0.6858 |
| 7 × 7 | 21.87 dB/ 0.5974 | 23.54 dB/ 0.6805 | 22.97 dB/ 0.6741 | 22.77 dB/ 0.6608 |
| 8 × 8 | 21.19 dB/ 0.5714 | 23.03 dB/ 0.6672 | 22.42 dB/ 0.6588 | 22.24 dB/ 0.6461 |

Table 5 (below) illustrates a subjective user evaluation of image quality for spatial zooming in detailed perspective display for all video images, where the score of 5 is best, and the score of 1 is worst. The unaltered video image scored an average score of 4.

|  | Int. Method | | | |
| --- | --- | --- | --- | --- |
| Sp. Down. rate | Nearest neighbor | Bilinear | Bicubic | Lanczos4 |
| 2 × 2 | 3 | 3.25 | 3.25 | 3.125 |
| 3 × 3 | 1.875 | 2.625 | 2.5 | 2.375 |
| 4 × 4 | 1.75 | 2 | 2 | 2 |

Table 6 (below) illustrates subjective evaluation of image quality for spatial zooming for panoramic views for all video images, where 5 is best, and 1 is worst.

|  | Int. Meth. | | | |
| --- | --- | --- | --- | --- |
| Down. Fr. Rate | Nearest neighbor | Bilinear | Bicubic | Lanczos4 |
| 1 | 3.5/ 3.75 | 3.875/4 | 4.125/ 4.125 | 3.5 3.375 |
| 2 | 4.125/3 | 3.625/ 3.25 | 4.125/ 2.375 | 3.625/ 2.75 |
| 4 | 4.5/ 2.375 | 4/2 | 4.125/ 1.75 | 4.125/ 1.75 |

Back to the method steps, the detailed precursor frames may be stored in a first temporary storage component and the panoramic precursor frames may be stored in a second temporary storage component.

Subsequently, the detailed precursor frames resulting in the detailed perspective display may be shown in a first output component 212. The panoramic precursor frames resulting in the panoramic perspective display may be shown in a second output component 214.

In certain embodiments, the system may be configured to detect certain features of the target (e.g., body tissue, body organ, surgical instrument) and the image display may be changed to highlight that feature.

Figure 7:
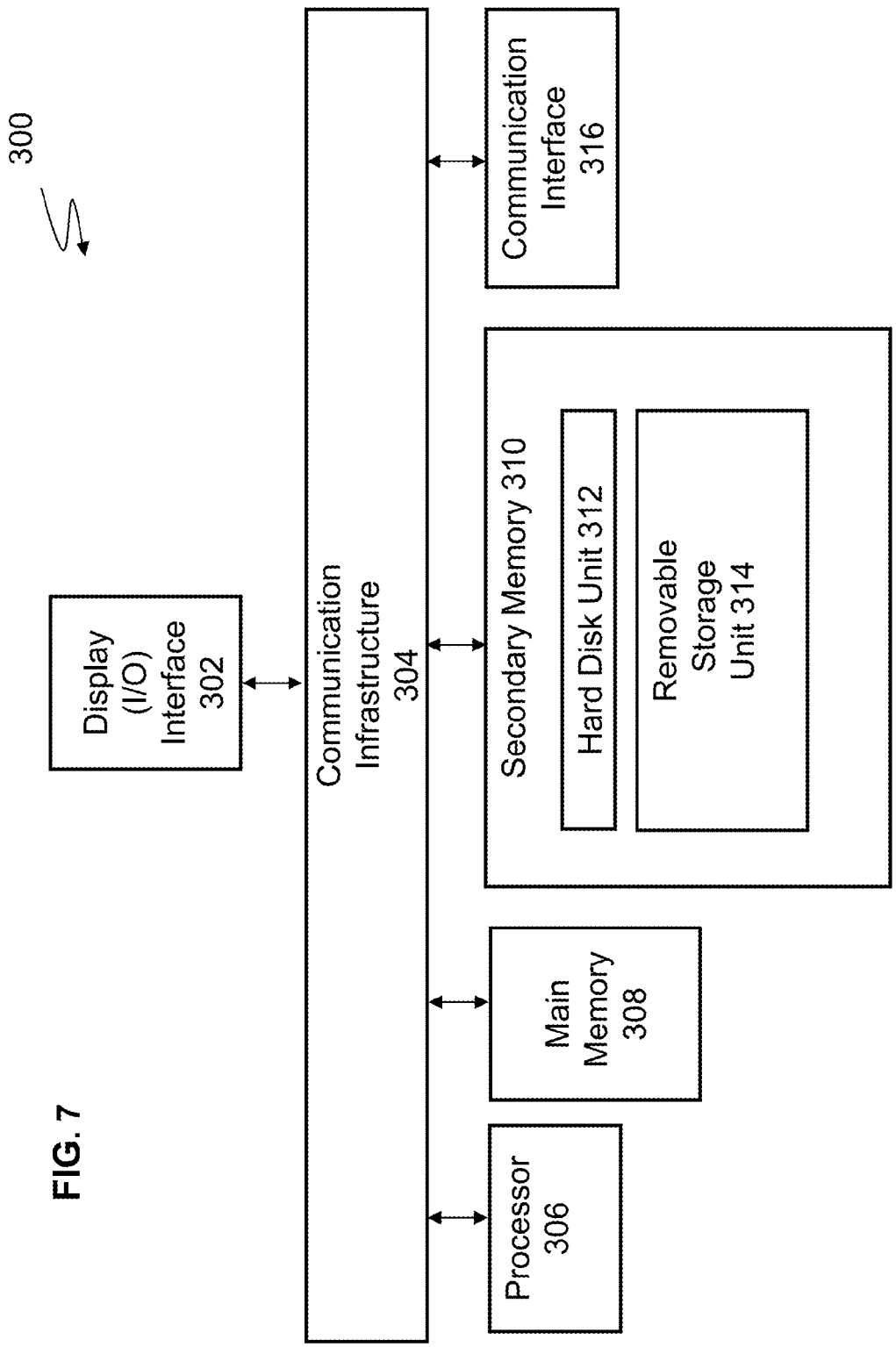
FIG. 7 illustrates an exemplary computer system.

FIG. 7 illustrates an exemplary computer system 300 that may be used to implement the methods according to the invention. One or more computer systems 300 may carry out the methods presented herein as computer code. In certain embodiments, the computer system 300 is configured to define the settings of the camera source component, one or more elements of the image management component, and/or the output component.

Computer system 300 includes an input/output interface 302 connected to communication infrastructure 304—such as a bus—, which forwards data such as graphics, text, and information, from the communication infrastructure 304 or from a frame buffer (not shown) to other components of the computer system 300. The input/output interface 302 may be, for example, a keyboard, touch screen, joystick, wand, video game controller, trackball, mouse, monitor, speaker, printer, Google Glass® unit, webcamera, any other computer peripheral device, or any combination thereof, capable of entering and/or viewing data.

Computer system 300 includes one or more processors 306, which may be a special purpose or a general-purpose digital signal processor that processes certain information. Computer system 300 also includes a main memory 308, for example random access memory ("RAM"), read-only memory ("ROM"), mass storage device, or any combination thereof. Computer system 300 may also include a secondary memory 310 such as a hard disk unit 312, a removable storage unit 314, or any combination thereof. Computer system 300 may also include a communication interface 316, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 308, secondary memory 310, communication interface 316, or a combination thereof, function as a computer usable storage medium, otherwise referred to as a computer readable storage medium, to store and/or access computer software including computer instructions. Certain embodiments of a computer readable storage medium do not include any transitory signals or waves. For example, computer programs or other instructions may be loaded into the computer system 300 such as through a removable storage device, for example, a floppy disk, ZIP disks, magnetic tape, portable flash drive, optical disk such as a CD or DVD or Blu-ray. Specifically, computer software including computer instructions may be transferred from the removable storage unit 314 or hard disc unit 312 to the secondary memory 310 or through the communication infrastructure 304 to the main memory 308 of the computer system 300.

Communication interface 316 allows software, instructions and data to be transferred between the computer system 300 and external devices or external networks. Software, instructions, and/or data transferred by the communication interface 316 are typically in the form of signals that may be electronic, electromagnetic, optical or other signals capable of being sent and received by the communication interface 316. Signals may be sent and received using wire or cable, fiber optics, a phone line, a cellular phone link, a Radio Frequency ("RF") link, wireless link, or other communication channels.

Computer programs, when executed, enable the computer system 300, particularly the processor 306, to implement the methods of the invention according to computer software including instructions.

The computer system 300 described herein may perform any one of, or any combination of, the steps of any of the methods presented herein. It is also contemplated that the methods according to the invention may be performed automatically, or may be invoked by some form of manual intervention.

The computer system 300 of FIG. 7 is provided only for purposes of illustration, such that the invention is not limited to this specific embodiment. It is appreciated that a person skilled in the relevant art knows how to program and implement the invention using any computer system.

The computer system 300 may be a handheld device and include any small-sized computer device including, for example, a personal digital assistant ("PDA"), smart handheld computing device, cellular telephone, or a laptop or netbook computer, hand held console or MP3 player, tablet, or similar hand held computer device, such as an iPad®, iPad Touch® or iPhone®.

Figure 8:
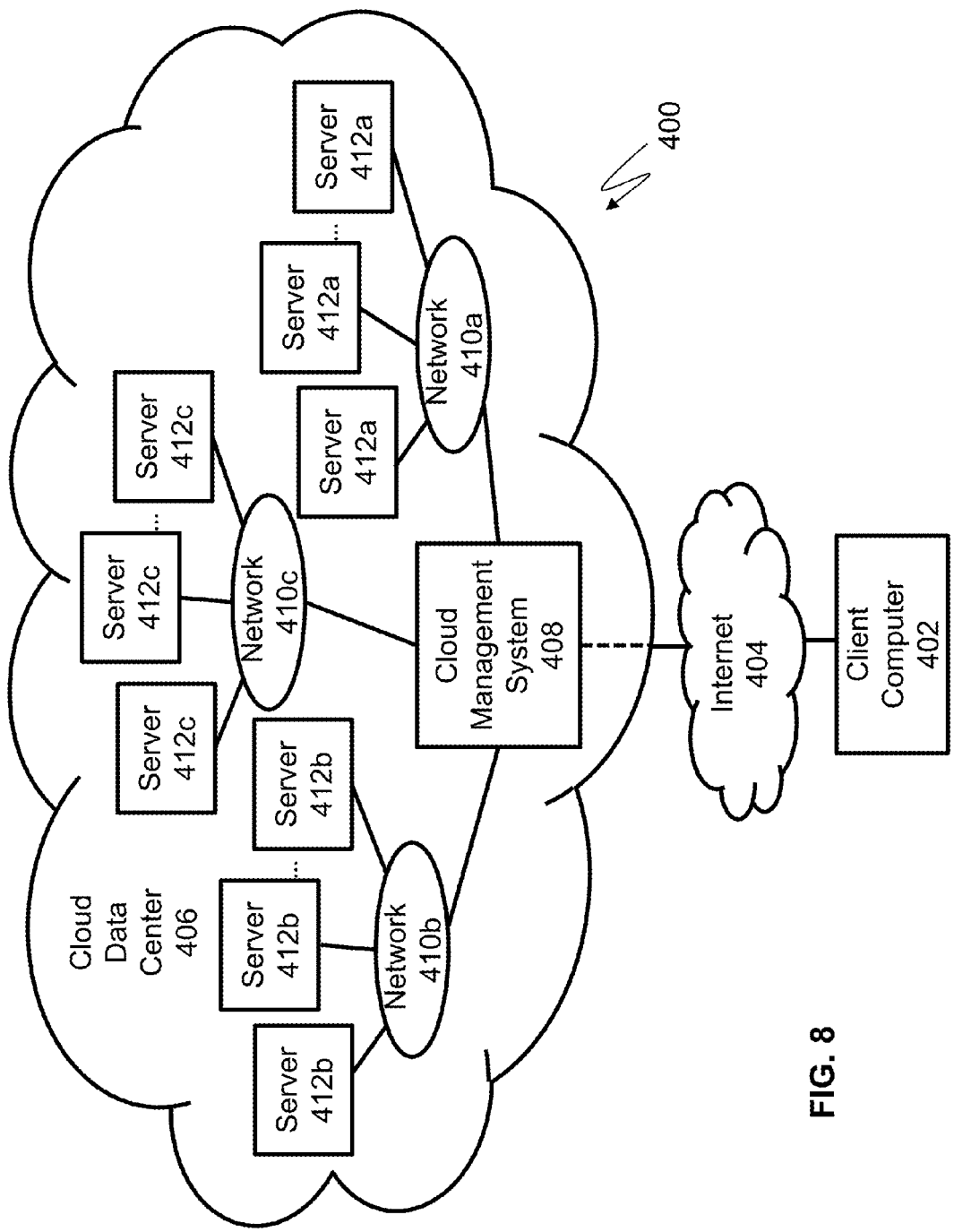
FIG. 8 illustrates an exemplary cloud computing system.

FIG. 8 illustrates an exemplary cloud computing system 400 that may be used to implement the methods according to the present invention. The cloud computing system 400 includes a plurality of interconnected computing environments. The cloud computing system 400 utilizes the resources from various networks as a collective virtual computer, where the services and applications can run independently from a particular computer or server configuration making hardware less important.

Specifically, the cloud computing system 400 includes at least one client computer 402. The client computer 402 may be any device through the use of which a distributed computing environment may be accessed to perform the methods disclosed herein, for example, a traditional computer, portable computer, mobile phone, personal digital assistant, tablet to name a few. The client computer 402 includes memory such as random access memory ("RAM"), read-only memory ("ROM"), mass storage device, or any combination thereof. The memory functions as a computer usable storage medium, otherwise referred to as a computer readable storage medium, to store and/or access computer software and/or instructions.

The client computer 402 also includes a communications interface, for example, a modem, a network interface (such as an Ethernet card), a communications port, a PCMCIA slot and card, wired or wireless systems, etc. The communications interface allows communication through transferred signals between the client computer 402 and external devices including networks such as the Internet 404 and cloud data center 406. Communication may be implemented using wireless or wired capability such as cable, fiber optics, a phone line, a cellular phone link, radio waves or other communication channels.

The client computer 402 establishes communication with the Internet 404—specifically to one or more servers—to, in turn, establish communication with one or more cloud data centers 406. A cloud data center 406 includes one or more networks 410a, 410b, 410c managed through a cloud management system 408. Each network 410a, 410b, 410c includes resource servers 412a, 412b, 412c, respectively. Servers 412a, 412b, 412c permit access to a collection of computing resources and components that can be invoked to instantiate a virtual machine, process, or other resource for a limited or defined duration. For example, one group of resource servers can host and serve an operating system or components thereof to deliver and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software.

The cloud management system 408 can comprise a dedicated or centralized server and/or other software, hardware, and network tools to communicate with one or more networks 410a, 410b, 410c, such as the Internet or other public or private network, with all sets of resource servers 412a, 412b, 412c. The cloud management system 408 may be configured to query and identify the computing resources and components managed by the set of resource servers 412a, 412b, 412c needed and available for use in the cloud data center 406. Specifically, the cloud management system 408 may be configured to identify the hardware resources and components such as type and amount of processing power, type and amount of memory, type and amount of storage, type and amount of network bandwidth and the like, of the set of resource servers 412a, 412b, 412c needed and available for use in the cloud data center 406. Likewise, the cloud management system 408 can be configured to identify the software resources and components, such as type of Operating System ("OS"), application programs, and the like, of the set of resource servers 412a, 412b, 412c needed and available for use in the cloud data center 406.

The present invention is also directed to computer products, otherwise referred to as computer program products, to provide software to the cloud computing system 400. Computer products store software on any computer usable medium, known now or in the future. Such software, when executed, may implement the methods according to certain embodiments of the invention. Examples of computer usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, Micro-Electro-Mechanical Systems ("MEMS"), nanotechnological storage device, etc.), and communication mediums (e.g., wired and wireless communications networks, local area networks, wide area networks, intranets, etc.). It is to be appreciated that the embodiments described herein may be implemented using software, hardware, firmware, or combinations thereof.

The cloud computing system 400 of FIG. 8 is provided only for purposes of illustration and does not limit the invention to this specific embodiment. It is appreciated that a person skilled in the relevant art knows how to program and implement the invention using any computer system or network architecture.

Figure 9:
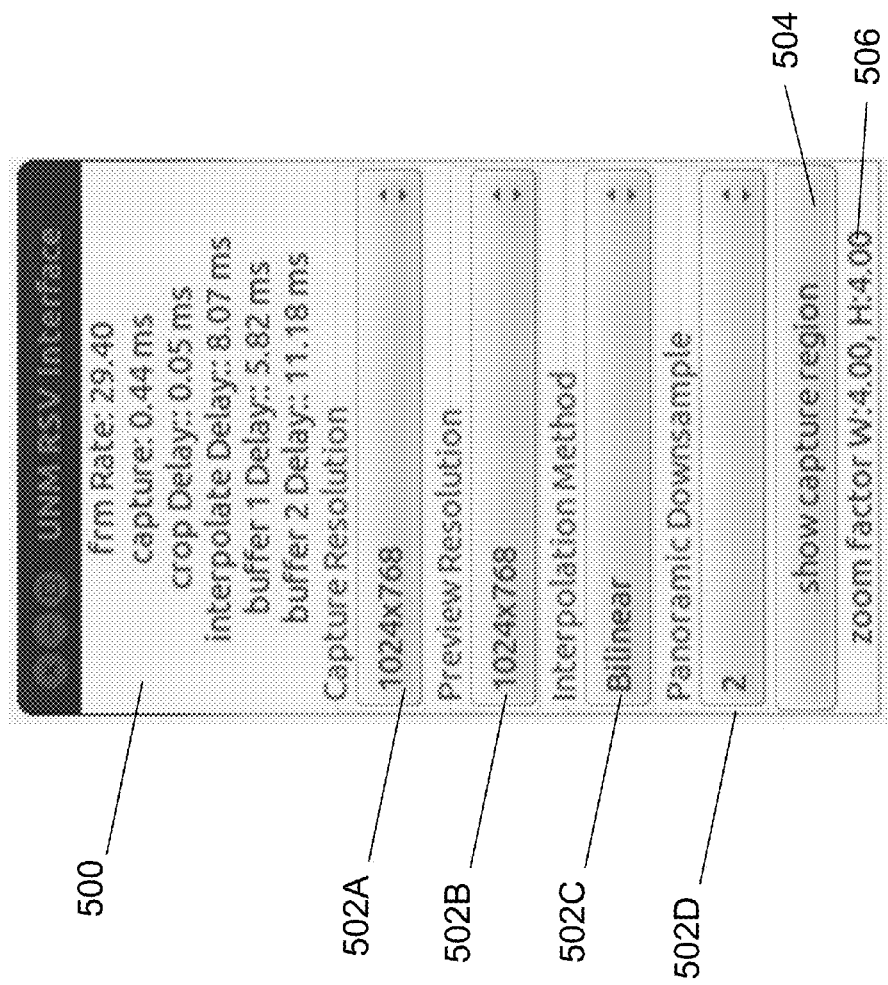
FIG. 9 illustrates a user interface according to the present invention.

FIG. 9 illustrates a user interface 500 according to certain embodiments of the present invention. A user interface 500 may include a number of fields 502 configured to permit a user to enter information (e.g., settings for some element or component of the system). For example, fields 502 may include a capture resolution field 502A, preview resolution field 502B, interpolation method field 502C, or a panoramic downsample field 502D. The user interface 502 also may include navigation buttons 504 and illustrate information already set or gathered in a context information field 506.

While the disclosure is susceptible to various modifications and alternative forms, specific exemplary embodiments of the present invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A system for producing a panoramic perspective display and a detailed perspective display from a single video image source, comprising:
   capturing an input video image into a first frame memory to obtain a first image;
   cropping a selected area of the first image from the first frame memory to obtain a cropped image;
   conducting interpolation to map the cropped image into a second frame memory;
   copying to a display buffer the first image from the first frame memory and the cropped image from the second frame memory;
   displaying from the display buffer the first image on a first user interface and the cropped image on a second user interface; and
   reconfiguring in real-time at least one of the first image and cropped image to meet changing surgical needs during a surgical operation.

2. The system of claim 1, wherein the conducting interpolation step includes computing pixel values from lower resolutions to increase perceived quality of the output video image.

3. The system of claim 1, wherein the conducting interpolation step is conducted using a nearest-neighbor approach.

4. The system of claim 1, wherein the conducting interpolation step is conducted using a bilinear approach.

5. The system of claim 1, wherein the conducting interpolation step is conducted using a bicubic approach.

6. The system of claim 1, wherein the conducting interpolation step is conducted using a Lanczos4 approach.

* * * * *